J. J. DUTROW.
ATTACHMENT FOR POTATO PLANTERS.
APPLICATION FILED APR. 9, 1914.

1,128,236.

Patented Feb. 9, 1915.

2 SHEETS—SHEET 1.

Inventor
John J. Dutrow

J. J. DUTROW.
ATTACHMENT FOR POTATO PLANTERS.
APPLICATION FILED APR. 9, 1914.
1,128,236.
Patented Feb. 9, 1915.
2 SHEETS—SHEET 2.
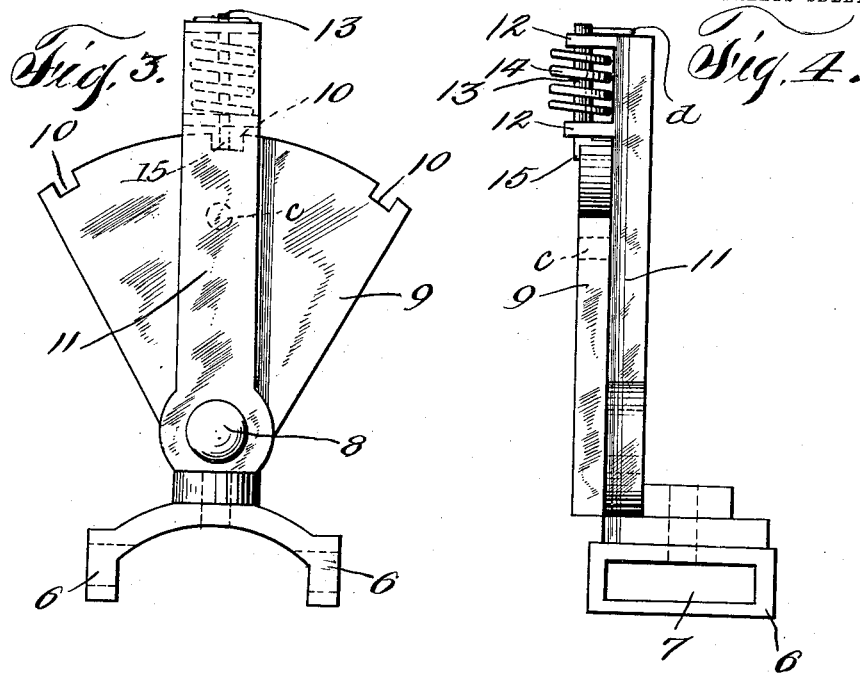
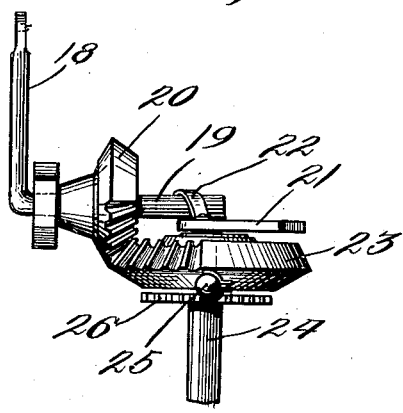
Witnesses
Inventor
John J. Dutrow
By
Attorney

UNITED STATES PATENT OFFICE.

JOHN J. DUTROW, OF WESTMINSTER, MARYLAND.

ATTACHMENT FOR POTATO-PLANTERS.

1,128,236. Specification of Letters Patent. Patented Feb. 9, 1915.

Application filed April 9, 1914. Serial No. 830,751.

*To all whom it may concern:*

Be it known that I, JOHN J. DUTROW, a citizen of the United States, residing at Westminster, in the county of Carroll and State of Maryland, have invented certain new and useful Improvements in Attachments for Potato-Planters, of which the following is a specification.

This invention relates to attachments for potato planters, and one of the principal objects of the invention is to provide reliable and efficient means for moving the covering disks laterally and for tilting the disk at the required angle to overcome the various conditions in covering potatoes.

Another object of the invention is to provide a sliding bar on which the covering disks are mounted, said bar being pivoted to tilt at any required angle, and means being connected to said bar to slide the same laterally for throwing dirt over the potatoes as they are dropped through the discharge boot.

Figure 1:
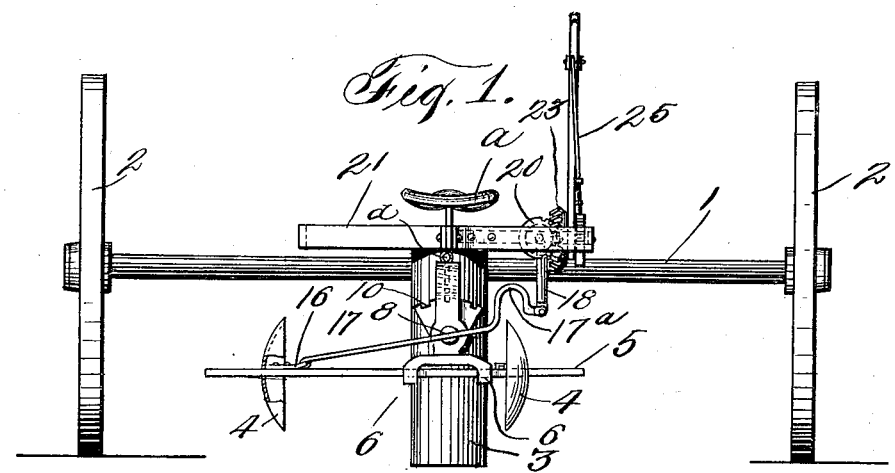
Figure 2:
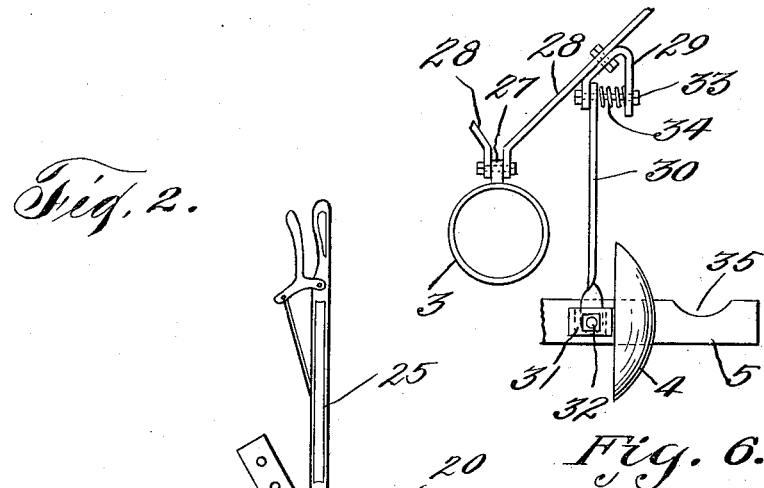
Figure 6:
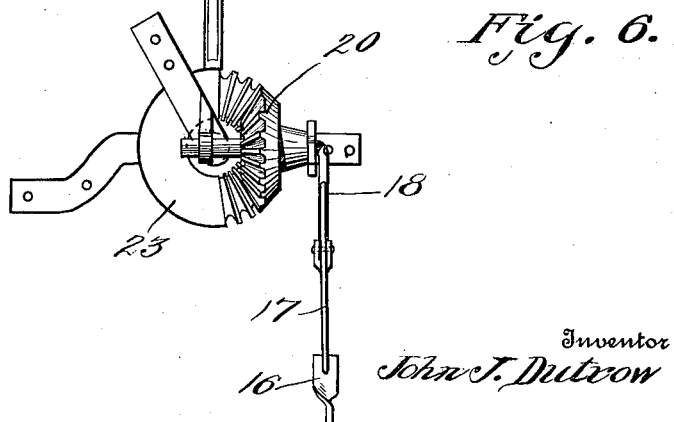

These and other objects may be attained by means of the construction illustrated in the accompanying drawings, in which:

Figure 1 is a view in rear elevation of an attachment for potato planters made in accordance with this invention, Fig. 2 is a view in elevation of the lever and connecting means for sliding the bar carrying the disk coverers, Fig. 3 is an enlarged elevation of the pivoted guide for the coverer bar and the spring bolt for holding the guide in adjusted position, Fig. 4 is a side elevation of the same, Fig. 5 is a view in elevation of the gearing for sliding the coverer bar, and Fig. 6 is a detail plan view of a brace pivotally connected to the coverer bar at one end and at its opposite end connected yieldingly to a frame brace or bar.

Referring to the drawings, the numeral 1 designates the axle and 2 are the traction wheels of an ordinary potato planter of the usual or any suitable construction. The discharge boot 3 which receives the potatoes from a hopper, (not shown), drops the potatoes in the center between the covering disks. The covering disks 4 are connected to a sliding bar 5, said bar extending through a guide consisting of spaced members 6 having rectangular openings 7 therein to receive the bar 5.

Connected integrally with the spaced guide members 6, is an arm 11, and this arm 11 is held connected to the boot 3 by means of a pin 8 which extends through the arm 11 and through a sector rack 9. The sector rack 9 is secured rigidly to the boot 3 in any suitable manner, as by a rivet $c$ shown in dotted lines in Fig. 3, and by means of the pin 8. The sector rack 9 is provided with a series of notches 10. Projecting from the arm 11 are lugs 12, and mounted to move in registered openings in said lugs 12 is a sliding bolt 13 to which a spiral spring 14 is connected at one end and disposed between the lugs 12, said spring surrounding the shank of the bolt 13. The tension of the spring 14 is exerted to normally hold the squared end 15 of the bolt in engagement with one of the notches 10 in the sector rack 9. At the top of the bolt 13 is a ring $d$, which may be grasped by the driver for lifting the bolt out of the notches 10 when it is desired to swing the covering disk up or down, one relatively to the other.

Connected to the sliding bar 5 is a plate 16 and engaging an eye in said plate is a connecting rod 17, said rod being upwardly curved at $17^a$ and attached at its opposite end to a lever 18, having an angular arm 19, on which is mounted a fixed mutilated gear 20. The angular member 19 is supported upon a bar 21 by means of a strap or keeper 22. A mutilated gear wheel 23 mounted on a shaft 24 is permanently meshed with the teeth of the gear 20, and connected to the gear 23 is a lever 25 provided with a spring bolt adapted to engage the teeth of a rack 26. Connected to a lug 27 upon the rear side of the boot 3 are diverging brace members 28 and connected to one of said brace members is an angular bracket 29. The braces 28 are supported on the frame of the machine in front of the axle 1. A brace 30 is pivoted in a strap 31 connected to the coverer bar 5, the pivot pin 32 extending through the strap and bar, and the brace 30 being connected at its opposite end by means of a bolt 33 extending through the two members of the bracket 29. A spring 34 surrounds the bolt 33 and bears at one end against the brace 30 and serving to hold the brace 30 yieldingly to compensate for the movements of the bar 5, said bar being provided with a curved recess 35 to serve as a foot rest.

The operation of the invention may be briefly described as follows: The driver sitting on the seat $a$ controls the movements of the covering disk 4 by shifting the lever 25 to move the bar 5 in the guide member 6 to either side of the discharge boot 3. Whenever, for any reason, it is deemed necessary to tip the bar 5 carrying the disks 4, this may be accomplished by moving the arm 11 to one side or the other by pulling upward on the ring $d$ to lift the lug 15 from one of the notches 10 in the rack 9 and then moving the arm 11 to the desired notch. When it is desired to hold the sliding bar 5 in a horizontal position the bolt and arm 11 is moved to the central notch in the rack 9.

From the foregoing it will be obvious that an attachment for potato planters made in accordance with this invention is comparatively simple in construction, can be readily attached to any standard make of potato planter, and that the coverer disks can be quickly moved laterally with relation to the discharge boot and that the disks may also be tilted at any required angle, thus operative efficiently under varying conditions upon irregular surfaces of the ground.

Various changes in the details of construction may be resorted to without departing from the spirit and scope of the invention as defined in the claims.

What is claimed is:

1. An attachment for potato planters comprising a discharge boot, a guide pivoted to said boot, a bar slidably mounted in said guide, disks connected to said bar, and means whereby said bar may be moved laterally in said guide, and means whereby said bar may be tipped upon its pivotal point.

2. An attachment for potato planters comprising a boot, a guide pivoted to the boot, a bar mounted to slide in the guide, disks connected to said bar, a lever and connections for sliding said bar in said guide, a rack, and a spring bolt for holding the bar at any required angle.

In testimony whereof I affix my signature in presence of two witnesses.

JOHN J. DUTROW.

Witnesses:
WILLIAM A. DAVIDSON, Jr.,
WILLIAM E. GURMBINE.

Copies of this patent may be obtained for five cents each, by addressing the "Commissioner of Patents, Washington, D. C."